(No Model.) 2 Sheets—Sheet 1.
J. FERGUSSON.
CUT-OFF AND DELIVERY TABLE FOR BRICK OR TILE MACHINES.
No. 375,319. Patented Dec. 20, 1887.
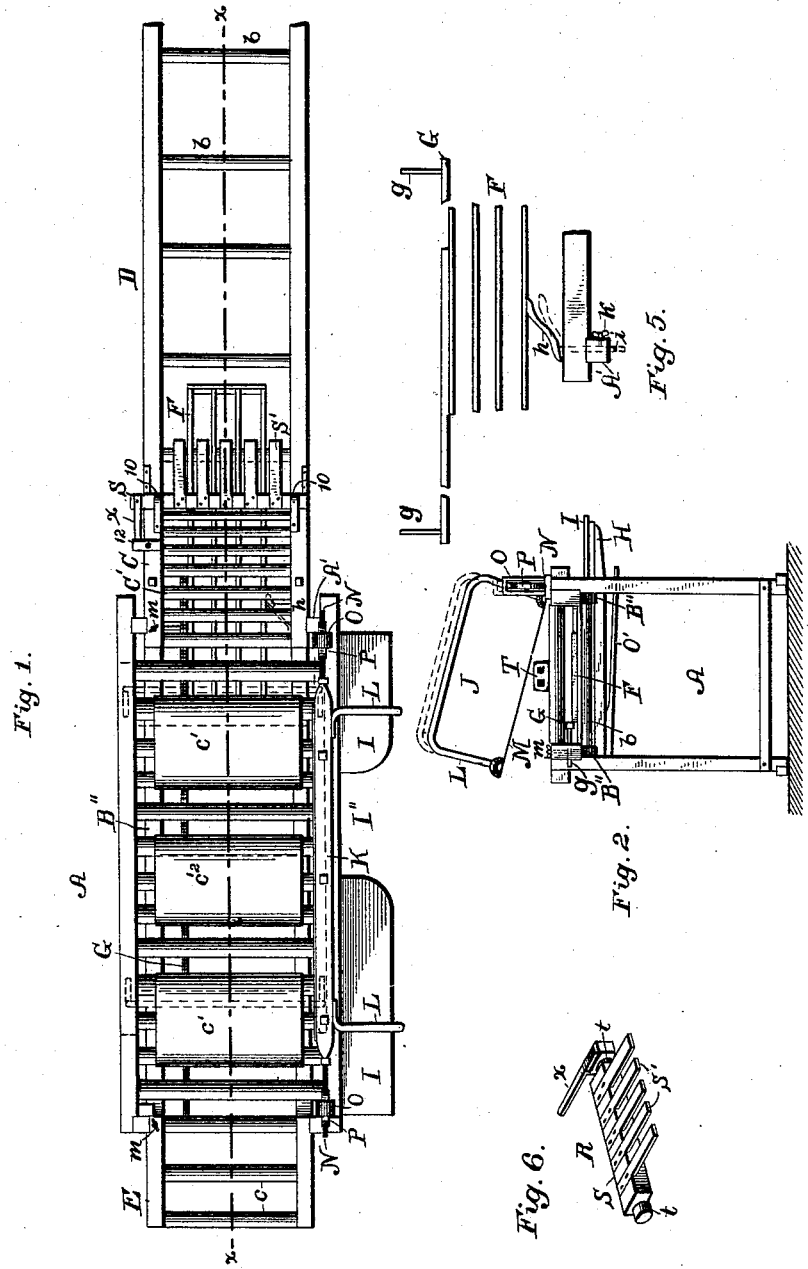
WITNESSES:
F. G. Fischer
Frank C. Rhodes
INVENTOR
John Fergusson
BY J. C. Higdon
ATTORNEY.

(No Model.) 2 Sheets—Sheet 2.
J. FERGUSSON.
CUT-OFF AND DELIVERY TABLE FOR BRICK OR TILE MACHINES.
No. 375,319. Patented Dec. 20, 1887.
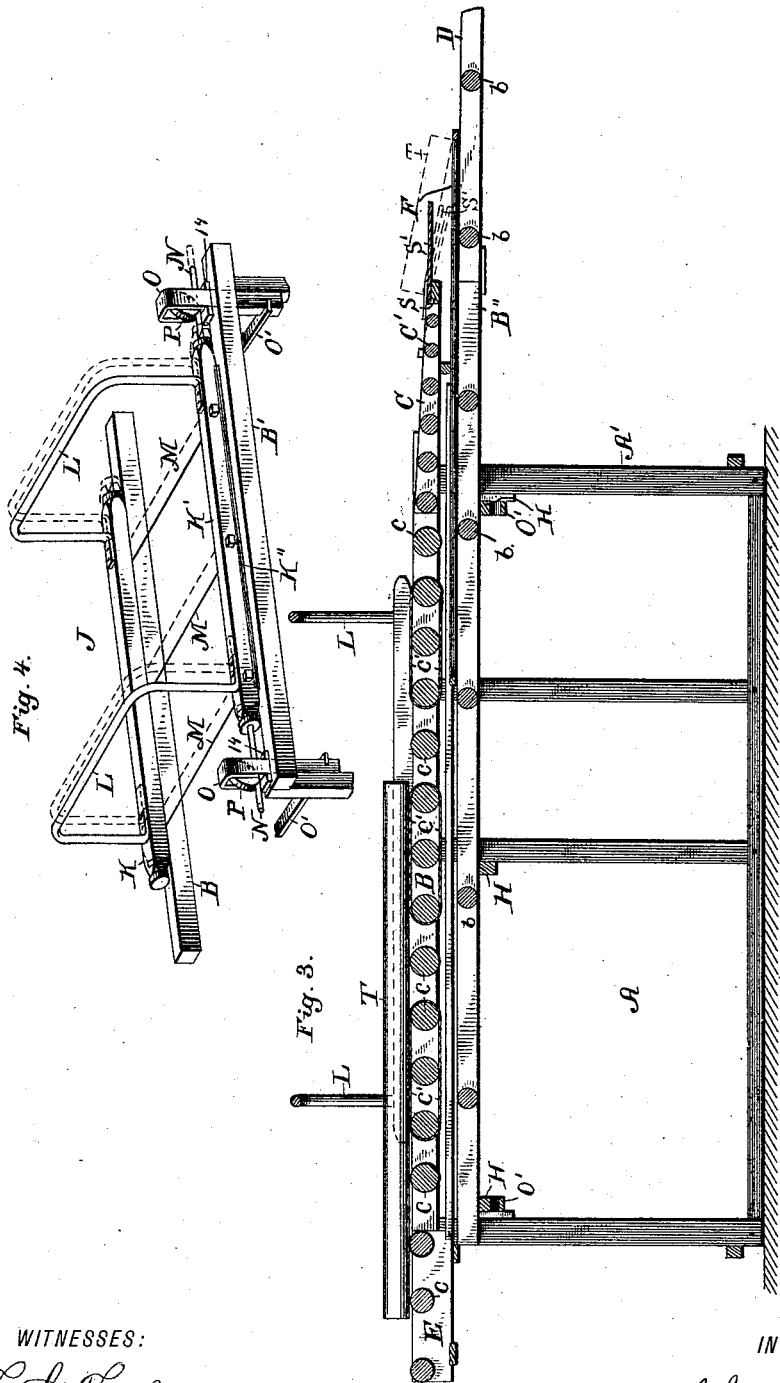
WITNESSES:
F. G. Fischer
Frank C. Rhodes
INVENTOR
John Fergusson
BY
J. P. Higdon
ATTORNEY

UNITED STATES PATENT OFFICE.

JOHN FERGUSSON, OF KANSAS CITY, MISSOURI.

CUT-OFF AND DELIVERY TABLE FOR BRICK OR TILE MACHINES.

SPECIFICATION forming part of Letters Patent No. 375,319, dated December 20, 1887.

Application filed May 14, 1887. Serial No. 238,181. (No model.)

*To all whom it may concern:*

Be it known that I, JOHN FERGUSSON, of Kansas City, Jackson county, State of Missouri, have invented certain new and useful Improvements in Cut-Off and Delivery Tables for Brick or Tile Machines, of which the following is a full, clear, and exact description, reference being had to the accompanying drawings, forming a part hereof.

The object of my invention is to provide the table with devices for facilitating the delivery and carrying off of the brick or tiles after they leave the tile-machine, to support them in their passage from the table to the palette, so that they may not be deformed or broken, and to obviate any necessity of lifting them by hand.

The invention may be said to consist in a cut-off table, such as is hereinafter described, provided with a track or way that is located beneath the tileway, or, in other words, in providing the table with a palette-way, providing such way with an extension for supporting the palettes after they receive the cut tile, providing said table with a yielding support for the tiles in their passage from the table to the palettes, providing an inclined extension for the said table to assist in the delivery of the tiles from said table to the palettes, said inclined extension carrying a series of rollers of diminishing diameter, providing the cut-off frame with devices for frictionally engaging the supporting-rollers of the tileway, so that it may be moved thereby during the cutting-off operation, providing said cut-off frame with yielding wheels or rollers, so that the side that is hinged to the table may rise and lower a limited distance, and providing an extension for the palette-way for receiving the palettes in their passage from the machine; and the invention further consists in details of construction, which will be hereinafter described.

In the accompanying drawings, which illustrate the manner of carrying out the invention, Figure 1 is a plan view of a machine embodying my improvements. Fig. 2 is an end elevation of the same, looking toward the end that is next adjacent to the tile-machine. Fig. 3 is a longitudinal section through the machine on line $x\ x$, Fig. 1. Fig. 4 is a detail view in perspective of the cut-off frame. Fig. 5 is a broken detail view showing a portion of a palette, a palette-gage, and a guiding-spring for pressing the palette, toward the said gage; and Fig. 6 is a detail view in perspective of a hinged and yielding supporting-apron used in making up the machine.

The main frame A consists of a pair of longitudinal bars, B and B', respectively, which carry a series of rollers, $e$, and constitute the tileway hereinbefore mentioned, and a suitable number of upright bars or supporting-legs, A', and cross-bars H. Just beneath the tileway so formed are a pair of parallel bars, B'', carrying a series of rollers, $b$. These devices constitute the palette-way. An extension for the palette-way is provided at the delivery end of the machine; and it consists of a pair of parallel bars, D, carrying rollers $b$, one end of the bars being detachably supported by and secured to the framing of the machine and the other being supported in any convenient way. The purpose of this palette-way extension is to receive and support the palettes after they receive the cut tile until they are removed for drying, &c.

An inclined extension for the tileway, composed of parallel side bars, C, and a series of rollers, C', journaled in said side bars, is attached to the delivery end of said way to assist in the delivery of the tiles from said way onto the palettes, and said rollers are of various diameters, the one of largest diameter being located next to the last roller carried by the delivery end of bars B B' and the next farther therefrom, and so on. A yielding supporting-apron, R, is hinged to the delivery end of said inclined extension of the tileway for supporting the tiles in their passage from said extension to the palettes, so that said tiles may not be deformed or broken, and to obviate any necessity for lifting them from the tileway to the palettes.

If so desired, I may dispense with the inclined extension of the tileway in some instances and attach the apron directly to the delivery end of said way.

The apron R consists in a bar, S, having journals $t$ and provided with laterally-extending arms S', which are attached thereto and extend therefrom in a direction corresponding to the passage of the tile. The journals $t$ of the apron are located in bearings 10, which are secured to the delivery end of the inclined extension. A flat spring, x, made of steel or other suitable material, is attached at one end to the bar S, while its other end extends back a short distance and engages a stop, 12, which is also located on the inclined extension. Any other suitable form of spring can be used for yieldingly supporting the outer end of the apron, although I prefer the one here described and shown.

The cut-off frame J can be of any desired construction, although I prefer to have it consist in a pair of longitudinally-parallel bars, K and K', respectively, which are connected together by the U-shaped frames or bows L and one or more cutting-wires, M, which are stretched from one bar to the other in the usual way. One of said bars, K', is provided with a covering of rubber cloth or other adhesive material, K'', upon its under side for frictionally engaging the rollers c of the tileway, and so causing the cut-off frame to travel with the same speed as that given to the tile during the cutting-off operation. Of course, however, the adhesive covering for said bar can be dispensed with, and the operation of the said frame would still be performed in a satisfactory manner. The bar K' is provided with a round journal, N, at each of its ends, which normally rest upon bearing-blocks 14, located upon the upper side of the framing of the machine. Anti-friction wheels P are located in hangers O and receive any upward pressure upon the journals of the cut-off frame, thereby permitting said frame to move with the tile more easily during the cutting-off operation, said journals acting as a fulcrum for the cutting-wires M. The lower ends of said hangers extend downwardly, and are engaged by the free end of wooden springs O', which extend laterally to the machine, and have their other end secured to one side of cross-bars H, as shown. With this construction it is obvious that said wheels impart a yielding pressure to the journals N, the hangers O being capable of rising and lowering, the springs O' tending to pull the hangers downward at all times, and thereby cause the bar K' to be in frictional contact with the rollers of the tileway, and yet permitting such contact to be loose and yielding.

Short canvas aprons or belts c' are located on a series of two or more of the tileway-rollers c for the purpose of causing a number of said rollers to move in unison by the passage of the tile material as it issues from the tile-machine and passes over them.

The palette F used in the machine may be of the ordinary form used for such purposes.

One side of the machine is provided with a platform, I, upon which the palettes are to be placed in feeding them to the machine. A portion of this platform is cut away at about the middle of its length to form a passage-way, I'', through which the operator may insert his arm to place the palettes in position. Just above the rollers b of the palette-way, and extending the full length of the main framing of the machine, and located upon the side of the machine that is opposite the flat form I, is located a guiding-gage, G, for the palettes. This gage is provided with a pin or bar, g, near each end, which extends at a right angle to its body and is adapted to be pushed in or pulled farther out of a suitable bearing formed in the framing to set the said gage in the desired position according to the width of palette used. Set-screws m are passed through the framing and are made to engage the said pins on the gage for the purpose of securing them at the desired adjustment. A guiding-spring, h, is adjustably secured to the delivery end of the framing for urging the palette toward the gage G and holding it in proper position for receiving the tile as it passes from the apron R. This spring may be of any desired form, of wood or metal, and one of its ends is arranged to engage the edge of the palette, for the purpose stated, and its other end is provided with a pin or extension, i, which is located in a suitable passage in the framing of the machine. Thus the said spring can be moved farther toward or from the edge of the palette to alter the pressure thereon, and it is held securely in the desired adjustment by means of a set-screw, k, which is passed through the framing and engages the pin i.

The receiving end of the machine, which is at the left hand of Figs. 1 and 3, is provided with a removable extension, E, which consists in a pair of short side bars carrying rollers c. This extension may be secured to the framing of the machine in any desired way that will permit of its being readily removed therefrom when required. Its removal will only be necessary in changing the dies of the tile-machine; but when such removal is accomplished abundant room for the operation of the changing dies will be provided.

With the foregoing construction the operation of the machine will be about as follows: The tile material T is forced from the dies of the tile-machine onto the extension E and the tileway-rollers c, the cut-off frame J being thrown back, as indicated in Fig. 1, the forward movement of said material revolving said rollers as it passes over them. After a sufficient length of material is on the tileway, the cut-off J is lowered to the position shown in Fig. 4, and a cut is made, the bar K' resting upon said rollers and causing said cut-off frame to move with the tile during the cutting operation, and thereby permitting of a clean straight cut. As the cut tile progress through the machine, they first reach the inclined extension of the tileway and pass over it onto the supporting-apron R, which they will depress slightly, and which will support them until they are safely located on the palette F, as indicated by dotted lines in Fig. 3. The palettes are to be placed upon the roller of the palette-way and shoved forward until they are in position to be engaged by the tile.

This machine is particularly adapted for use with hollow rectangular blocks of material, commonly known as "terra-cotta lumber."

Having thus described my invention, what I claim is—

1. A cut-off table for brick or tile machines arranged with a yielding support for the tiles in their passage from the table to the receiving-palette, substantially as described.

2. A cut-off table for brick or tile machines arranged with a tileway and a palette-way, substantially as described, and provided with a yielding support for the tiles in their passage from said tileway onto the palettes.

3. In a cut-off table for brick or tile machines, an inclined extension for the tileway, in combination with a yielding apron secured to the delivery end of said extension, substantially as described.

4. The cut-off frame of a brick or tile machine provided with an adhesive surface for frictionally engaging rollers of the tileway, substantially as herein described.

5. In a cut-off table for brick or tile machines, the cut-off frame hinged to the table and provided with longitudinally-sliding journals, in combination with yielding wheels which engage said journals and urge them downwardly, substantially as described.

6. In a brick or tile cut-off table, a palette, a palette-gage, and a spring for guiding the palette and holding it parallel to said gage.

In testimony whereof I affix my signature in presence of two witnesses.

JOHN FERGUSSON.

Witnesses:
    THOS. B. McAULEY,
    FREDK. G. FISCHER.